| United States Patent [19] | [11] | 4,098,714 |
|---|---|---|
| Derleth et al. | [45] | Jul. 4, 1978 |

[54] WATER SOFTENING MATERIALS

[75] Inventors: Helmut Derleth; Maria Hansen; Ingeborg Lange; Artur Kürs, all of Nienburg, Germany

[73] Assignee: Kali-Chemie AG, Hanover, Germany

[21] Appl. No.: 697,616

[22] Filed: Jun. 18, 1976

[30] Foreign Application Priority Data

Jun. 19, 1975 [DE] Fed. Rep. of Germany ....... 2527243

[51] Int. Cl.² ........................... C02B 5/02; C02B 1/22
[52] U.S. Cl. ................................... 252/181; 252/175; 427/215; 427/218; 427/372 A; 427/394; 427/396; 210/47; 210/52
[58] Field of Search .............. 252/175, 179, 180, 181, 252/317; 427/215, 218, 372, 390, 394, 396; 210/47, 52

[56] References Cited

U.S. PATENT DOCUMENTS

| 3,342,742 | 9/1967 | Cocks | 252/175 |
| 3,388,060 | 6/1968 | Clark | 252/175 X |
| 3,607,742 | 9/1971 | Steigerwald, Jr. | 252/181 |

Primary Examiner—Mayer Wenblatt

Attorney, Agent, or Firm—Bacon & Thomas

[57] ABSTRACT

Disclosed is a process for preparing a water softening composition which comprises the steps of:
(a) applying to finely divided solid carrier particles of an inorganic material selected, e.g., from the group consisting of aluminosilicates having an $Al_2O_3$ content of from 1 to 75% by mole, kioselguhr, a silicic acid composition containing 67 mole % of $SiO_2$, 1 mole % of $Al_2O_3$ and 278 mole % of $H_2O$, a silica gel containing 12.24% of $SiO_2$, 7.35% of $N_2SO_4$, 0.41% of $Na_2O$ and 80% of $H_2O$, aluminum oxide, alumina hydrate, bentonite and sodium sulfate, a solution of sodium aluminate having a concentration of from about 0.2% to 25% by weight and a molar ratio $Na_2O/Al_2O_3$ of from about 0.3 to 47, in an amount which is sufficient to coat the particles with an outside layer of sodium aluminate amounting from about 0.5 to about 50% by weight of the particles; and, (b) drying the coated particles at a temperature of from about 20° to 120° C. to a residual moisture content of from about 5% to 30% by weight. Also disclosed are the resulting water softening compositions and method of using same.

11 Claims, No Drawings

WATER SOFTENING MATERIALS

The present invention relates to solid, finely divided materials for water softening, especially as additive to washing agents [or detergents], as well as to a process for their manufacture.

The materials according to the invention consist of an inorganic or organic solid carrier and a layer of sodium aluminate present thereon. The solid matter systems according to the invention are favorably distinguished, [when] compared with known materials, by an increased calcium binding power as well as by [the fact that they] can be manufactured in a simple manner, and by their relatively favorable price. Because the materials according to the invention can at least partly replace the polyphosphates used for the same purpose of use, especially in detergents, the advantage is achieved that waste water [sewage] encumbrance by phosphates is considerably decreased.

Heretofore, among others, the following phosphate-free materials have been suggested for water softening and as additive to detergents:

(1) Water soluble aluminates such as sodium or barium aluminate;

(2) water-insoluble natural or synthetic sodium aluminum silicates in the crystalline or amorphous state. [The following agents] belong to Group (2):

Permutites, i.e. synthetic amorphous sodium aluminum silicates being capable of ion exchange and being of the approximate composition

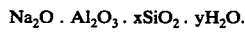

$Na_2O \cdot Al_2O_3 \cdot xSiO_2 \cdot yH_2O.$

They can be produced from the melt or from solutions at normal or increased temperature. Their calcium binding power amounts, for instance, to 6 mg. of calcium oxide CaO per g. or, respectively, to 18 mg. of calcium oxide CaO per 3 g.

Molecular sieves, i.e. three-dimensional systems of (Si, Al)-$O_2$-tetrahedrons with pores in the form of channels and/or of enlargements [expansions], passage through said enlargements being possible by way of narrowed spaces. Such materials are described, for instance, in German Published Applications Nos. 2,412,837; 2,433,485; and 2,439,572.

Other [materials], such as clay minerals in the form of kaolin, bentonite, glauconite.

Calcium ions which are dissolved in water are precipitated as difficulty soluble compound or, respectively, are bound by ion exchange in the solid matter systems by the above mentioned materials.

The calcium binding power measured under standard conditions as described, for instance, in German Published Application No. 2,412,837, page 27, of sodium aluminate of the composition $1.25\ Na_2O \cdot Al_2O_3 \cdot 0.5\ H_2O$ amounts to 110 mg. of calcium oxide CaO per g. or, respectively, to 230 mg. of calcium oxide per 3 g. The calcium binding power of aluminum silicates as they are described in German Published Application No. 2,412,837, amounts to 140 mg. of calcium oxide CaO per g. or, respectively, to 295 mg. of calcium oxide per 3 g. of agent. Thus an improvement of about 100% is achieved calculated for the aluminate employed for producing said aluminum silicates. In this connection it makes no difference according to page 4, paragraph 2, whether amorphous or crystalline products are taken into consideration. The calcium binding power is exclusively proportional to the amount of the aluminum introduced into these materials by the aluminate. Surprisingly it was found that the calcium binding power, calculated for the introduced aluminate, can further be increased up to more than 400% in case of the materials according to the present invention, in contrast to the materials described in German Published Application No. 2,412,837.

Deviating from the known homogeneous soluble aluminates or the insoluble, in themselves homogeneous ion exchange agents based on aluminum silicate with a structure similar to that of molecular sieves or of a composition similar to that of permutites, the water softening materials according to the present invention consist of a carrier with a layer of sodium aluminate of optimum layer thickness which has been applied [to the carrier] from [a] solution and by subsequent drying. It could not be foreseen that the calcium binding power, depending on the carrier used and the layer thickness, would be considerably different from the [calcium binding power] of the sum of the single components when simply coating carriers with a layer of sodium aluminate. That the calcium binding power of the layer applied [to a carrier] is affected by said carrier and by th thickness of the layer, can be designated as a synergistic activation.

One could assume that, when treating in this manner a carrier on the base of silicic acid or aliminum silicate, a boundary layer similar to a molecular sieve or to permutite would be formed. Proof of the fact that a layer similar to a molecular sieve or to permutite is not of decisive importance for the synergistic effect with respect to the water softening materials of the present invention but that the coated layer of optimum thickness [is of importance] can be demostrated by the following facts:

(1) On applying a layer of sodium aluminate to a carrier of active aluminum oxide such as, for instance of the crystal structure of γ-aluminum oxide, pseudo-boehmite or hydrargaillite, a strong synergistic effect with respect to the calcium binding power is achieved. The formation of a molecular sieve is not possible in said system. Permutoidal sodium ions, on the other hand, cannot explain the magnitude of the [synergistic] effect.

(2) As is known, sodium fluoride in aqueous solution shows also a calcium binding power which is due to the precipitation of difficultly soluble calcium fluoride. Surprisingly a layer of sodium fluoride applied to a carrier of silicic acid, aluminum oxide, or aluminum silicate shows also a comparable strong synergistic effect. In this system there is likewise excluded the formation of the molecular sieve or of a permutite.

(3) More particularly, however, the possibility of using organic carriers for the effect according to the present invention demostrates that the optimum layer thickness is of decisive importance.

As carrier material for the coating there can be employed such materials which do not at all possess a calcium binding power such as, for instance, kieselguhr, ground silica gel or silica gel which is still moist from its preparation, clays, cellulose, and cellulose derivatives, synthetic polymers.

But it is also possible to use such carriers which possess already a certain activity with respect to the calcium binding power. Various aluminum silicates and sodium aluminum silicates, synthetic ion exchange agents belong to such [carriers].

The materials mentioned hereinabove are provided according to the invention with a layer of sodium aluminate, and as a result thereof yield the materials according to the present invention of a high calcium binding power.

Finally the layer of sodium aluminate according to the present invention can also be produced in such a manner that active aluminum oxide is treated with sodium hydroxide solution which may also contain aluminate, and is dried.

It has been found that best results are achieved when using an oil- and fat-free carrier.

The advantages of the water-softening materials according to the present invention are the following:

(1) Very broad selection of carriers based on aluminum oxide, silicic acid, aluminum silicate, sodium sulfate, organic natural or synthetic materials such as, for instance, mechanical wood pulp, ground Styropor [said selection being] in accordance with their behavior in the washing process such as, for instance, in assisting [improving] the degree of whitening and brightening.

(2) The technically simple manufacture of the water-softening materials according to the present invention can be considered as a singular technical advance because there is involved merely the treatment of the carriers with an aluminate solution and the subsequent drying procedure under mild conditions.

(3) In contrast to many aluminates the materials according to the present invention do not cake at moisture contents up to 30%.

(4) Finally the water-softening materials according to the present invention are especially valuable with respect to their costs of manufacture since the starting materials used are readily available and relatively favorable with respect to their price.

The synergistic effect according to the present invention is achieved by treating the carrier with solutions of sodium aluminate. Carriers based on aluminum oxide/aluminum hydroxide can even be reacted only with sodium hydroxide solution or with sodium hydroxide solution containing aluminate and subsequent drying. The magnitude of the effect according to the present invention is controlled by the selection of the carrier, the concentration and the $Na_2O$-$Al_2O_3$- ratio of the sodium aluminate, the amount of liquid used for impregnation, the manner, temperature, and duration of the drying process, the residual moisture content.

As a result thereof very many possibilities of combinations are available. The essence [nature] of the invention thus comprises all these possibilities of combination even insofar as they are not recognizable already from the subsequent examples.

The composition according to the present invention is characterized by a sodium aluminate layer coated on the carrier which amounts from 0.5 to 50%, preferably from 15 to 35% of the weight of the carrier substance.

According to an embodiment of the invention, the composition is further characterized by a particle size of 0.1 μm to 100 μm., preferably of 1 μm. to 50 μm.

According to another embodiment of the invention, the composition is further characterized by a calcium binding power of from 100 mg to 1500 mg preferably of from 250 mg to 1300 mg of calcium oxide per g of sodium aluminate layer substance calculated with respect to a composition of $1.25\ NaO\ .\ Al_2O_3\ .\ 0.5\ H_2O$.

According to an embodiment of the invention, the composition is characterized by a carrier with a calcium binding power of less than 10 mg. of calcium oxide per g.

According to another embodiment of the invention, the composition is characterized by a carrier with a calcium binding power of 10 mg to about 200 mg of calcium oxide per g.

According to an embodiment of the invention, the composition is characterized by the carrier being oxidic compounds of aluminum and/or silicon.

The process of producing the water softening composition according to the present invention is characterized by the feature, that the carriers are treated with a solution of sodium aluminate of a concentration of 0.02% by weight, to 25% by weight, preferably of 0.03% by weight, to 2.7%, by weight, and a molar ratio $Na_2O : Al_2O_3$ of 0.3 to 47, preferably of 1.25 to 4.3, and are dried subsequently at temperatures of 20° to 120° C., preferably at 80° C. to a residual moisture content of 5%, by weight, to 30% by weight, preferably of 10% by weight, to 25% by weight.

According to another embodiment of the invention, the process of producing the water softening composition is characterized by the feature, that carriers of aluminum oxide or aluminum hydroxide, for instance, of the crystal structure of γ-aluminum oxide, pseudo-boehmite or hydragillite are treated with 1 to 50%, preferably with a 4%, solution of sodium hydroxide and are subsequently dried at temperatures of 20 to 120° C., preferably at 80° C., to a residual moisture content of 5% by weight, to 30% by weight, preferably of 10% by weight, to 25%, by weight.

According to yet another embodiment of the invention, the process of producing the water softening composition is characterized by the feature, that carriers of activated aluminum oxide or aluminum hydroxide, preferably with the crystal structure of pseudo-boehmite or hydrargillite, are treated with a sodium aluminate solution of a concentration of 0.005%, by weight to 40%, by weight, preferably of 0.5 by weight, to 4% by weight, and a molar ratio $Na_2O : Al_2O_3$ of 46 to 1000, and are subsequently dried at temperatures of 20° to 120° C., preferably at 80° C., to a residual moisture content of 5% by weight, to 30% by weight, preferably of 10% by weight, to 25% by weight.

The present invention comprises the coating of carriers with sodium aluminate and a synergistic effect achieved thereby. As a measure for the latter [effect], therefore, serves the calcium binding power (CBP) of the sodium aluminate $1.25\ Na_2O\ .\ Al_2O_3\ .\ 0.5\ H_2O$, which, under standard conditions (see German Published Application No. 2,412,837, page 27) amounts to 110 mg. of calcium oxide CaO per g. or, respectively, to 230 mg. per 3 g.

The preparation of the solid matter systems according to the invention and the values achieved with respect to the calcium binding power are stated in the following examples.

EXAMPLE 1

4 kg. of kieselguhr which has no calcium binding power, were stirred at room temperature with 11 kg. of a solution which contains 1 kg. of sodium aluminate of the composition $2.8\ Na_2O\ .\ Al_2O_3$. The resulting mixture was dried at 80° C. to a residual moisture content of 20% and the dried soft agglomerates were comminuted. The calcium binding power amounted to 70 mg. of calcium oxide CaO per g. or, respectively, to 210 mg. per 3 g. of the substance. Calculated for the aluminate layer of the calculated composition $1.25\ Na_2O \cdot Al_2O_3 \cdot 0.5\ H_2O$, said values correspond to values of 583 mg. per g. or, respectively, to 1750 mg. per 3 g.

EXAMPLE 2

As described in Example 1, there were treated the materials of the following Table I (a-k) with sodium aluminate and the stated values for the calcium binding power were achieved. Column 1 indicates the carrier, column 2 the starting calcium binding power of the carrier, columns 3 and 4 the calcium binding power of 1 g. or, respectively, 3 g. of the solid matter system according to the invention, columns 5 and 6 the calcium binding power calculated for 1 g. or, respectively 3 g. of the aluminate layer.

EXAMPLE 4

20 kg. of a silica gel of the composition

| | |
|---|---|
| $SiO_2$ | 12.24%, |
| $Na_2SO_4$ | 7.35%, |
| $Na_2O$) | 0.41%, |
| water | 80.00%, | prepared from waterglass solution and sulfuric acid were treated according to Example 1. The calcium binding power values achieved thereby were as follows:

| CBP of carrier | CBP per 3 g. of product | CBP calculated for 3 g. of aluminate layer |
|---|---|---|
| 40 | 0 | 156 | 1300 |

TABLE I

| | Calcium binding power of the carrier per g. | CBP per g. | CBP per 3 g. | CBP per g. of aluminate layer | CBP per 3 g. of aluminate layer |
|---|---|---|---|---|---|
| a) Sodium aluminum silicate $Na_2O \cdot Al_2O_3 \cdot 2SiO_2 \cdot 2H_2O$ produced from water glass and aluminum sulfate solution | 0 | 30 | 70 | 250 | 583 |
| b) Waste silicic acid of the composition 67 moles % of silicon dioxide $SiO_2$, 1 mole % of aluminum oxide $Al_2O_3$, 278 moles % of water $H_2O$ | 6 | 110 | 130 | 916 | 1083 |
| c) Glass pot clay of Gross-Almerode | 0 | 50 | 120 | 416 | 1000 |
| d) Pseudo-Boehmite NF (Condea) | 4 | | 174 | | 1450 |
| e) Hydrargillite N (Martinswerk) | 0 | | 156 | | 1300 |
| f) Hydrargillite (partly dehydrated at 350° C. to a residual water content of 20%, comminuted to 10 μm.) | 2 | | 168 | | 1400 |
| g) Activated aluminum oxide (commercial product) | 4 | | 174 | | 1450 |
| h) Alumina wet hydrate (commercial product) (about 58% of aluminum oxide $Al_2O_3$) | 0 | 125 | 290 | 1041 | 2416 |
| i) Bentone EW (commercial product) | 20 | 100 | 190 | 832 | 1583 |
| j) Silicon dioxide gel dried at 80° C. and comminuted to 30 μm., water content 23% | 0 | | 168 | | 1400 |
| k) $SiO_2 \cdot Al_2O_3$ gel, prepared from water glass and aluminum sulfate of the composition: 64 moles % of $SiO_2$; 1 mole % of $Al_2O_3$; 13 moles % of $H_2O$, dried at 200° C. | 0 | 60 | 140 | 500 | 1166 |

EXAMPLE 3

In the examples of Table II there were used carriers which comprise aluminum silicates of different composition and made according to different processes, also with respect to their starting materials. Coating of the aluminate layer according to the present invention was carried out according to Example 1.

EXAMPLE 5

In Example 5 a water soluble, solid carrier was employed which can be added as builder material in the commercial detergents. The preparation of the material according to the present invention by using sodium

TABLE II

| No | Aluminum silicate carrier with mole % of aluminum oxide $Al_2O_3$ | Preparation from | CBP per g. of carrier dried at 80° C. | CBP per g. of product | CBP per 3g. of product | CBP per g. of aluminate layer | CBP per 3g. of aluminate layer |
|---|---|---|---|---|---|---|---|
| a) | 2 | | 6 | 90 | 220 | 750 | 1833 |
| b) | 5 | | 16 | 100 | 220 | 833 | 1833 |
| c) | 10 | | 26 | 110 | 240 | 916 | 2000 |
| d) | 15 | Aluminum sulfate | 20 | 130 | 290 | 1083 | 2416 |
| e) | 20 | and waterglass | 32 | 160 | 270 | 1333 | 2250 |
| f) | 25 | | 34 | 130 | 270 | 1083 | 2250 |
| g) | 50 | | 10 | | 108 | | 900 |
| h) | 50 | Addition of Pseudo-Boehmite | 26 | | 168 | | 1400 |
| i) | 2 | | 10 | 80 | 250 | 666 | 2083 |
| j) | 5 | | 16 | 100 | 260 | 833 | 2166 |
| k) | 10 | | 40 | 130 | 285 | 1083 | 2375 |
| l) | 15 | | 22 | 120 | 260 | 1000 | 2166 |
| m) | 20 | Aluminum sulfate, aluminate, | 26 | 120 | 265 | 1000 | 2208 |
| n) | 25 | and waterglass | 34 | 60 | 130 | 500 | 1082 |
| o) | 50 | | 14 | 100 | 240 | 833 | 2000 |
| p) | 40 | | 32 | 50 | 140 | 416 | 1166 |
| q) | 60 | | 38 | 70 | 180 | 583 | 1500 |
| r) | 75 | | 40 | 70 | 180 | 583 | 1500 | sulfate as carrier was effected as described in Example 1 and the following results were achieved:

| Carrier | CBP of the carrier | CBP per 3 g. of product | CBP per 3 g. of aluminate layer |
|---|---|---|---|
| Sodium sulfate | 0 | 130 | 1083 |

EXAMPLE 6

Alumina is treated in this example with sodium hydroxide solution only. 4 kg. of carrier were stirred with 10 liters of a sodium hydroxide solution of the normality as given in the folliwng TABLE III and were dried at 80° C. to a final moisture content of 19%.

TABLE III

| Carrier | CBP per g. of carrier | Normality of the sodium hydroxide solution | CBP/g. of product | CBP/3 g. of product |
|---|---|---|---|---|
| Pseudoboehmite NF (Condea) | 4 | 1 | 70 | 120 |
| Hydrargillite N (Martinswerk) | 0 | 1 | | 102 |
| Hydrargillite N (partly dehydrated at 350° C. to a residual water content of 20%, comminuted to 10 μm.) | 2 | 0.5 | | 63 |
| | | 1 | | 129 |
| | | 2 | 60 | 180 |
| | | 3 | 110 | 280 |
| | | 4 | | 162 |

EXAMPLE 7

In Example 7 there were stirred 4 kg. of the carrier, before the treatment with sodium aluminate, with 10 liters of water to which, for instance, 30 drops of a wetting agent such as Arkopal (Hoechst) were added for defattening the carrier material. The carrier was allowed to settle, was washed twice with 5 liters of water each time, and was dried at 80° C.

The coating was effected as in Example 1 and the following results were achieved:

TABLE IV

| Carrier | CBP per g. of carrier | CBP/1g. of product | CBP/3g. of product | CBP per g. of aluminate layer | CBP per 3g. of aluminate layer |
|---|---|---|---|---|---|
| Pseudoboehmite NF (Condea) | 4 | 100 | 265 | 833 | 2208 |
| Hydrargillite N (Martinswerk) partly dehydrated at 350° C. to a residual water content of 20%, comminuted to 10μm | 2 | 175 | 230 | 1458 | 1917 |

EXAMPLE 8

In Example 8 there were used as carrier material organic natural materials and organic polymers for preparing the material according to the invention. The preparation was again effected as described in Example 1. The sodium aluminate layer was coated upon the finely communiuted organic substances with the following results:

| Carrier | CBP of carrier | CBP per 1g. of product | CBP per 3g. of product | CBP per 1g. of aluminate layer | CBP per 3g. of aluminate layer |
|---|---|---|---|---|---|
| Styropor (subjected to wet grinding) | 0 | 150 | 265 | 1250 | 2208 |
| Mechanical wood pulp | 0 | 50 | 60 | 416 | 500 |

What is claimed is:

1. A process for preparing a water softening composition which comprises the steps of:
   (a) applying to finely divided solid carrier particles of an inorganic material selected from the group consisting of aluminosilicates having an $Al_2O_3$ content of from 1 to 75% by mole, kieselguhr, a silicic acid composition containing 67 mole % of $SiO_2$, 1 mole % of $Al_2O_3$ and 278 mole % of $H_2O$, a silica gel containing 12.24% of $SiO_2$, 7.35% of $N_2SO_4$, 0.41% of $Na_2O$ and 80% of $H_2O$, aluminum oxide, alumina hydrate, bentonite and sodium sulfate, a solution of sodium aluminate having a concentration of from about 0.02% to 25% by weight and a molar ratio $Na_2O/Al_2O_3$ of from about 0.3 to 47, in an amount which is sufficient to coat said particles with an outside layer of sodium aluminate amounting from about 0.5 to about 50% by weight of said particles; and,
   (b) drying the coated particles at a temperature of from about 20° to 120° C. to residual moisture content of from about 5% to 30% by weight.

2. The process as defined by claim 1, wherein the layer of sodium aluminate coated on the carrier particles amounts to from about 15 to 35% of the weight of the carrier particles.

3. The process as defined by claim 1, wherein said coated particles have a particle size of from about 0.1 μm to 100 μm.

4. The process as defined by claim 1, wherein said water softening composition has a calcium binding power of 100 mg. to 1500 mg. of calcium oxide per g. of sodium aluminate layer substance calculated with respect to a composition of 1.25 NaO . $Al_2O_3$ . 0.5 $H_2O$.

5. The process as defined by claim 1, wherein said carrier has a calcium binding power of less than about 10 mg. of calcium oxide per g.

6. The process as defined by claim 1, wherein said carrier has a calcium binding power of from about 10 mg. to about 200 mg. of calcium oxide per g.

7. The process of claim 1, wherein said concentration is from about 0.03% to 2.7%, by weight, said molecular ratio is from about 1.25 to 4.3, said temperature is about 80° C. and said residual moisture content is from about 10% to 25%, by weight.

8. The process according to claim 1, comprising the steps of applying to carrier particles of activated aluminum oxide or aluminum hydroxide, a sodium aluminate solution having a concentration of from about 0.005% to 40%, by weight, and a molar ratio $Na_2O : Al_2O_3$ of 46 to 1000, and subsequently drying the coated particles at a temperature of from about 20° to 120° C. to a residual moisture content of from about 5 to 30% by weight.

9. The process for softening water which comprises treating an aqueous liquid with a composition produced according to the process as defined in claim 1 in an amount sufficient to bind a substantial portion of the calcium ions dissolved in the aqueous liquid.

10. The process according to claim 1, comprising the steps of applying to carrier particles comprising aluminum oxide or aluminum hydroxide, a 1% to 50% solution of sodium hydroxide and subsequently drying the coated particles at a temperature of from about 20° to 120° C. to residual moisture content of from about 5 to 30%, by weight.

11. The process according to claim 10, wherein said solution is a 4% solution of sodium hydroxide, said temperature is 80° C. and said residual moisture content is between about 10 and 25%, by weight.

* * * * *